United States Patent
Maurer et al.

[19]

[11] Patent Number: 6,009,750
[45] Date of Patent: Jan. 4, 2000

[54] SEAT TEST BODY

[75] Inventors: Ute Maurer, Waiblingen; Karl Pfahler; Eberhard Faust, both of Stuttgart; Norbert Polifke, Ostfildern, all of Germany

[73] Assignee: DaimlerChrysler AG, Stuttgart, Germany

[21] Appl. No.: 09/080,231

[22] Filed: May 18, 1998

[30] Foreign Application Priority Data

May 17, 1997 [DE] Germany ............................ 197 20 854

[51] Int. Cl.$^7$ ............................ A61B 5/00; G01M 19/00
[52] U.S. Cl. .................................................................. 73/172
[58] Field of Search .............................. 73/172, 767, 768, 73/862.043, 862.542, 862.621, 862.623, 865.6, 865.8, 866.4; 434/267, 270

[56] References Cited

U.S. PATENT DOCUMENTS

| | | | |
|---|---|---|---|
| 5,152,692 | 10/1992 | Richards | 73/866.4 |
| 5,259,765 | 11/1993 | Richards | 73/866.4 |
| 5,747,676 | 5/1998 | Faust et al. | 73/862.621 |
| 5,821,415 | 10/1998 | Faust et al. | 73/172 |

FOREIGN PATENT DOCUMENTS 41 03 374  9/1992  Germany .

OTHER PUBLICATIONS

*ATZ Automobiltechnische Zeitschrift* 97 (1995), vol. 10, entitled "Vibration Dummy Simulates Sitting Person" by Von Johannes Knoblauch et al., pp. 668–671 (no month).

*SAE 1994 Transactions—Journal of Passenger Cars*, Section 6, vol. 103, entitled "Simulation of the Hybrid III Dummy Response to Impact by Nonlinear Finite Element Analysis" by T.B. Khalil et al., pp. 1868–1886 (no month).

*Primary Examiner*—William Oen
*Attorney, Agent, or Firm*—Evenson, McKeown, Edwards & Lenahan, P.L.L.C.

[57] ABSTRACT

A seat test body is provided for vibration measurements. In order to be able to obtain, during vibration measurements in the whole spectral range, measuring results which can be compared at least qualitatively with corresponding test person measurements, the buttocks imitation and the back imitation of the seat test body are each formed by padded hard parts. The hard parts of the buttocks imitation and those of the back imitation imitate true to life the corresponding bone structure of a human skeleton at least with respect to the portion of the skeleton which is loaded during sitting. With respect to the layer thickness, the softness, the elasticity and the damping behavior as well as the local distribution of these parameters, the padding of the hard parts anthropomorphically imitates the soft parts in the buttocks area and the back area. For achieving the required sitting weight of the seat test body, a passive ballast in the form of several weights is placed on the interior side into the buttocks imitation and/or is placed on shelf-type consoles on the interior side of the back imitation. Relative to the buttocks imitation, the back imitation is disposed to be swivellable within a limited angular space about the hip joint point and is elastically prestressed in the sense of a stretched position of the back part and the buttocks part.

16 Claims, 4 Drawing Sheets

SEAT TEST BODY

This application claims the priority of German patent application DE 197 20 854.1, filed May 17, 1997, the disclosure of which is expressly incorporated by reference herein.

BACKGROUND AND SUMMARY OF THE INVENTION

The invention is based on a seat test body for vibration tests for seats, for example of a motor vehicle.

A seat test body is known, for example, from German Patent Document DE 41 03 374 C1. The inventors also described that seat test body in *Automobiltechnische Zeitung ATZ* 97 (1995), Volume 10, Pages 668 to 671.

One of the aspects of developing seats, particularly vehicle seats, is that a high sitting comfort is desirable. The reason is that occupants of vehicles, and particularly the driver, may have to remain in the vehicle seat for many hours while they can move very little. Among other aspects, a good vibration capacity of the seat also plays a role in this case. In the course of the development of a seat, various seat and cushion constructions are produced as test samples, which must be compared with one another objectively and reproducibly with respect to different testing and evaluating criteria, mainly concerning the comfort and the vibration capacity, in order to be able to then select the best test samples. Not only new test samples of a current seat development but also various test seats of different origins, for example, seats of earlier generations of seats; used seats or seats from outside development or manufacturing facilities of any pairing are compared with one another.

For vibration testing, the seat together with a test person sitting on it or with a seat test body placed on it, is excited to perform vertical vibrations, and the response vibrations of the test body or the test person are measured. During the vibration measurements, flat cushion-shaped acceleration sensors are placed on the contact zone of the buttocks with the surface of the seat cushion and this vibration is measured as a response vibration. The obtained response vibrations are entered in a diagram as the spectral distribution of the vibration amplitudes in relation to the corresponding excitation amplitude. These so-called transmission curves are— starting with a very slow, quasi-static excitation— determined into the range of approximately 30 Hertz. Typically, the transmission curves start at a value of 1.0 and will then have a clear resonance point in the range of approximately 5 Hz. Then, it will, as a rule, clearly fall under the value of 1 and will extend—in a range of the seat damping—in a slightly falling manner with an increasing excitation frequency.

The initially mentioned known seat test body consists of a seat shell which has a rigid surface and corresponds to the shape of the buttocks, including the thigh part of a human being, and of a rigid back shell which is connected with the seat shell and which corresponds to the shape of the back. Several damped spring/mass systems which can vibrate vertically are installed in the seat shell for simulating the vertical vibrating tendency of parts and regions of the body, the weight and the mass distribution of the spring/mass systems corresponding approximately to the one-seat weight of a person of average weight. The buttocks shell and the back shell of the seat test body are rigidly arranged with respect to one another at an angle which corresponds to the sitting position of a human being, in which case the back shell only has the function of supporting the seat test piece during the vibration test on the backrest cushion and to stabilize it in position on the seat. Before a vibration test of a seat with the known seat test piece, this seat test body, together with the seat shell, is placed loosely on the seat cushion of the seat and the back shell is leaned against the backrest cushion.

The applicant carried out comparative measurements using the known seat test bodies, on the one hand, and test persons, on the other hand, in various seats. The comparison of the measurements showed that the measurements provide correct information only in the area of the resonance rise and even there only tendentiously correct information. The resonance rise determined by the applicant by means of the known seat test piece quantity quantitatively did not correspond to the values measured by means of test persons. According to the applicant's experiences, the measuring results of the known seat test body in the area of the seat damping are even less comparable. Above approximately 7 Hz, the transmission curve determined with the seat test body extends in an ascending manner and toward the end of the measuring range even reaches rise values which partly are clearly over the resonance rise, whereas the test person measurements showed a drop of the transmission values to below 0.5. A comparison of a well-damping seat with a less well-damping seat shows that the known seat test body in the area of the seat damping furnishes not even tendentiously useful measuring values. This comparison demonstrates that—at least according to the applicant's experiences—the know seat test body can furnish information which can be compared with information concerning test person vibration measurements only to a very limited degree and cannot replace this type of measurement. Therefore, vibrations tests of seats could be carried out only by using test persons. These naturally require high expenditures with respect to time and personnel and, in addition are hardly reasonable.

It would be conceivable to carry out such vibration tests by means of test dummies. Test dummies of the third generation are described, for example, in "SAE 1994 Transactions"—*Journal of Passenger Cars*, Section 6, Volume 103, Pages 1868–1886. With respect to the mechanical moving behavior and the mass distribution of the overall body, they have an anthropomorphous design. However, with respect to individual body regions or members, the dummies partly have a fairly rudimentary construction and with respect to details cannot be considered to be an anthropomorphous construction. This applies particularly to the seat part of the pelvic area which is of interest here. This area is completely unimportant for full dummies, as used for accident tests, although it is stated there in connection with the pelvis that it consists of an aluminum casting structure whose shape is approximately similar to a human pelvic bone structure. It is stated that this pelvis is enclosed by a soft rubber material in order to approximate the shape of human buttocks which also contains a three-axis acceleration generator.

Beyond the mentioned information from the indicated literature, the following can be stated on the basis of experiences with and observation of Hybrid III Dummies used everywhere in the pertinent development and testing facilities— thus, also by the applicant—in several models and in different heights. The hard parts, as, for example, soft parts surrounding the pelvic body are constructed as double-walled hollow pieces made of a soft rubber whose wall thickness amounts to approximately 3 to 5 mm. The hollow space enclosed by the double walls is filled with flexible foam. Such a double-wall hollow soft part is assigned to each individual limb—lower leg—thigh—pelvis—upper body—upper arm—lower arm—hand. The double-walled hollow parts are longitudinally slotted so that they can be pushed in each case over the pertaining hard part and can be closed with a zipper. The inside contour of the hollow soft part is roughly adapted to the hard parts of the limb to be enclosed, that is, with a certain play, whereas the outside contour corresponds approximately to the outside shape of the corresponding part of the body. The soft parts of the individual dummies do not adjoin one another directly; a large gap is left open between adjacent soft parts so that the limbs of the dummy can move without being hindered. Thus, a gap of 3 to 4 cm extends in the transition area from the thigh into the buttocks part or at the transition from the buttocks into the back. With a view to the high loads applies to the testing dummies in the case of simulated accidents and with a view to their repeated usability—they are very expensive—the soft parts must have a certain minimum stability at least on their exterior side and must not be too soft because these soft parts would otherwise be destroyed during accident simulations. The soft parts enclosing the pelvic area have a Shore hardness of approximately 40 to 50 degrees of hardness in the buttocks area which is distributed largely uniformly along the seat part of the buttocks. The outer shape of the dummy's buttocks—deviating from the human model—has a relatively flat shape. It should therefore be pointed out that, in the buttocks area, there exists only a rough approximation to the human anatomy which, however, is completely sufficient for the use as a test dummy in crash tests even in the third generation of dummies. By means of the only approximated flat reproduction of this seat contour, the tilting and sliding action of a dummy sitting in a cushion, which is relevant in the case of a crash, is to be approximated to the sitting stability of a real human being. A surface shape which is approximated to the shape of the buttocks and an elasticity in the buttocks area of the test dummy which approximately matches close to the surface is sufficient for this purpose. However, according to experiences obtained by means of the invention, comfort and vibration tests on seat cushions of vehicle seats cannot be accurately determined with such a test dummy.

It is an object of the invention to provide a seat test body whose measuring results determined during vibration measurements on vehicle seats in the whole spectral range are comparable at least qualitatively with corresponding test person measurements.

This and other objects have been achieved according to the present invention by providing a seat test body for vibration measurements on seats, comprising: a buttocks imitation to be placed on a seat cushion of a seat to be tested and which points downward in a testing position, a back imitation coupled with the buttocks imitation and which is to be leaned against a backrest cushion of the seat to be tested in the testing position, and passive ballast in the form of several weights placed on at least one of an interior side of the buttocks imitation and an interior side of the back imitation, said seat test body having a weight and mass distribution corresponding approximately to the weight and mass distribution of a sitting person, the buttocks imitation and the back imitation each being formed hard parts and padding, the hard parts of the buttocks imitation simulating a pelvic bone, thighs, and hip joints of a human skeleton at least with respect to the underside of the skeleton which would be loaded while sitting, the hip joints being fixable to immobility under a test load, the hard parts of the back imitation simulating the lordotic area of a pelvic bone, a spinal column, and a back side of a chest cage including a shoulder blade region, of the human skeleton, the padding of the hard parts of the buttocks imitation anthropomorphically imitating the soft parts of a human buttocks area, including muscle tissue, connective tissue and fatty tissue, and the two sitting pressure points of the human buttocks, with respect to the parameters of shape, position, hardness, hardness distribution, layer thickness, softness, elasticity, damping behavior, imitating the hard parts and the soft parts of the human skeleton as close to life as possible.

A definitive idea of the invention is to provide a simulation of the vibration-related coupling of the seat test body, which is as true to life as possible, to the seat cushion and the backrest cushion. The transition from the cushions into the seat test body with respect to vibrations is to be simulated as exactly as possible to the corresponding "interface" between man and machine. The dominating phenomenon in this case is an anthropomorphous construction and distribution of the soft parts in the single seat area starting from the underside of the thighs and extending into the shoulder area. It is important in this case that the seat test body causes not only a deformation of the cushion surface corresponding to a sitting person but also a sitting pressure distribution which corresponds to the natural sitting position. This is accomplished via the construction of the seat test body which is soft according to the invention. According to the applicant's experiences, inherently dynamic influences of individual parts or regions of the body fade into the background in comparison to an anthropomorphically "soft" coupling of the seat test body to th e seat.

Other objects, advantages and novel features of the present invention will become apparent from the following detailed description of the invention when considered in conjunction with the accompanying drawings.

DETAILED DESCRIPTION OF THE DRAWINGS

Figure 6:
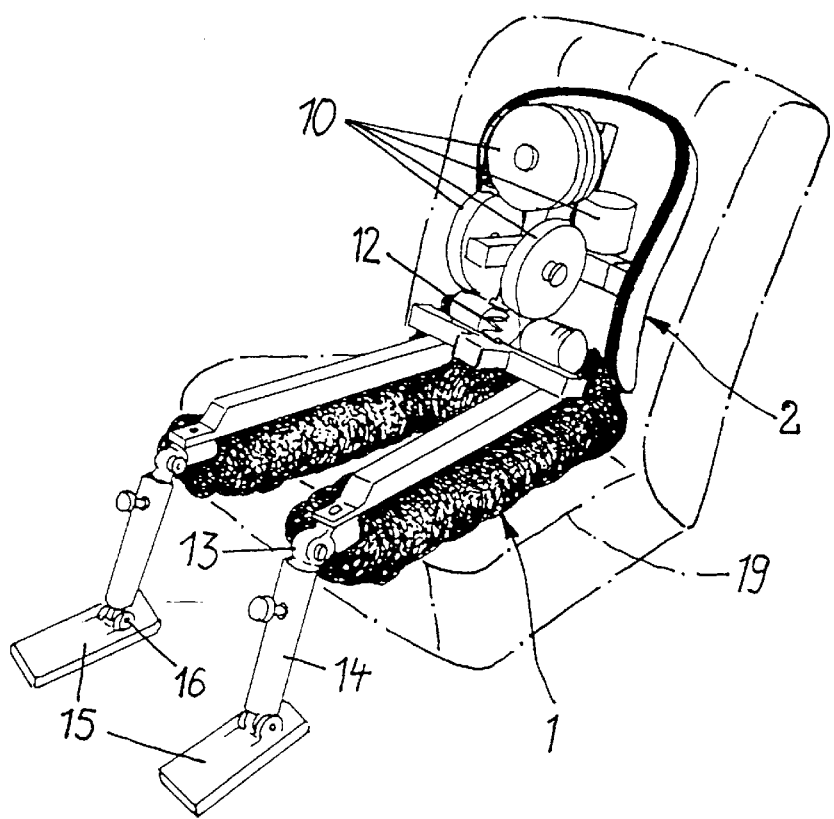
FIG. 6 is a view of the seat test body according to FIG. 5 which is completed has ballast weights and is ready for testing.

FIG. 6 of the drawings shows a completed test body which is ready for vibration measurements in a vehicle seat 19 indicated by dash-dotted lines. It has a buttocks reproduction or imitation 1 which points downward in the testing position and can be placed on the seat cushion of the seat to be tested as well as a back imitation 2 which is connected with the buttocks imitation 1 and in the testing position can be leaned against the backrest cushion of the seat. With respect to its weight and its mass distribution, the seat test body corresponds approximately to the single-seat weight and the mass distribution of a person of an average weight.

The seat test body of the present invention allows vibration measurements to be conducted on seats, particularly vehicle seats, with measuring results in the entire relevant spectral range, that is, from almost zero to approximately 30 Hz, being quantitatively and qualitatively at least comparable with corresponding test measurements of an actual test person. In order to achieve such accurate test results, the buttocks imitation 1 and the back imitation 2 of the seat test body are in each case formed by cushioned hard parts, the hard parts and particularly the soft parts being further developed anthropomorphically so that with respect to vibrations, the seat testing body is coupled to the seat cushion and to the backrest cushion as true to life as possible. The transition from the cushions into the seat test body with respect to vibrations must be simulated as precisely as possible to the natural "interface" between an actual person and the seat.

For this purpose, the hard parts of the buttocks reproduction 1 are simulated to the pelvic bone 3 and to the thigh 4, including the hip joints 5, of a human skeleton as true to life as possible, at least with respect to the underside of the skeleton which is loaded during sitting. The joints 5, which are imitations of hip joints, can be made sluggish by correspondingly bracing the ball of the joint in the socket of the joint via a thrust collar and clamping screws and can even be fixed to immobility under a test load. The padding 7 of the hard parts 3, 4 of the buttocks imitation 2 with respect to the layer thickness, softness, elasticity and the damping behavior as well as the local distribution of these parameters anthropomorphically simulates the soft parts in the buttocks area, specifically the muscle tissue, connective tissue and fatty tissue. Mainly as the result of the hard buttocks parts and their padding, the two seat pressure points 8 of a human buttocks and its close surroundings imitate the skeleton parts and soft parts as true to life as possible with respect to the shape, the position, the hardness and the local hardness distribution.

Figure 1:
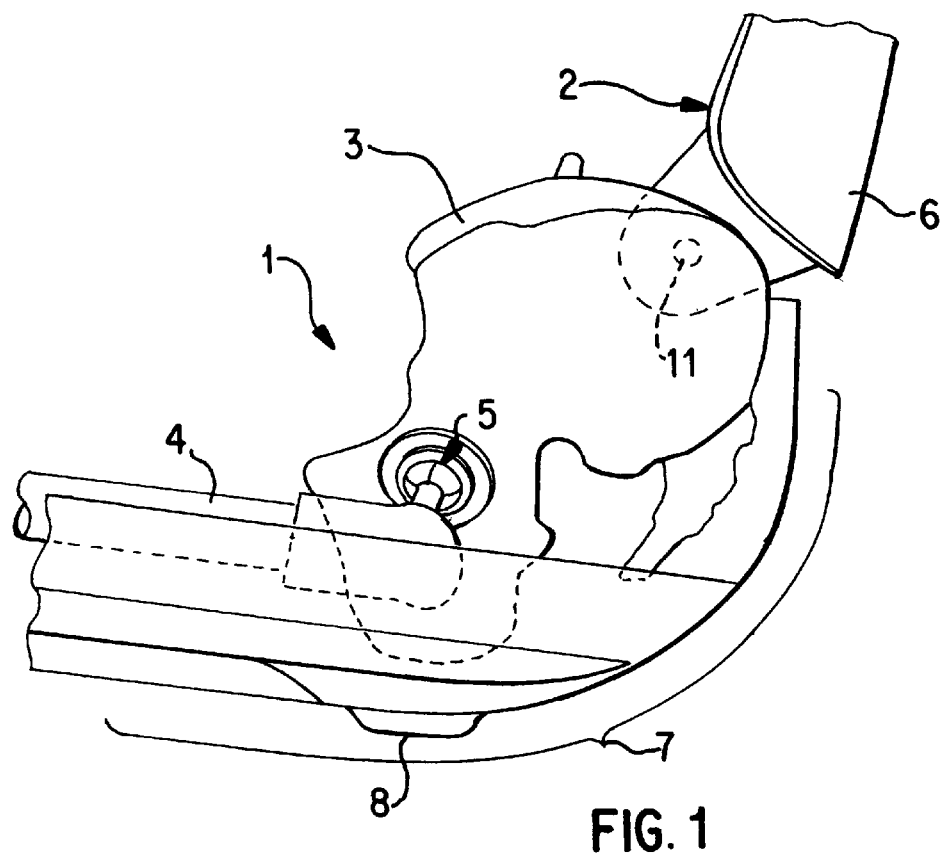
FIG. 1 is a lateral view from the left side of the buttocks part of a seat test body according to a preferred embodiment of the present invention.
Figure 2:
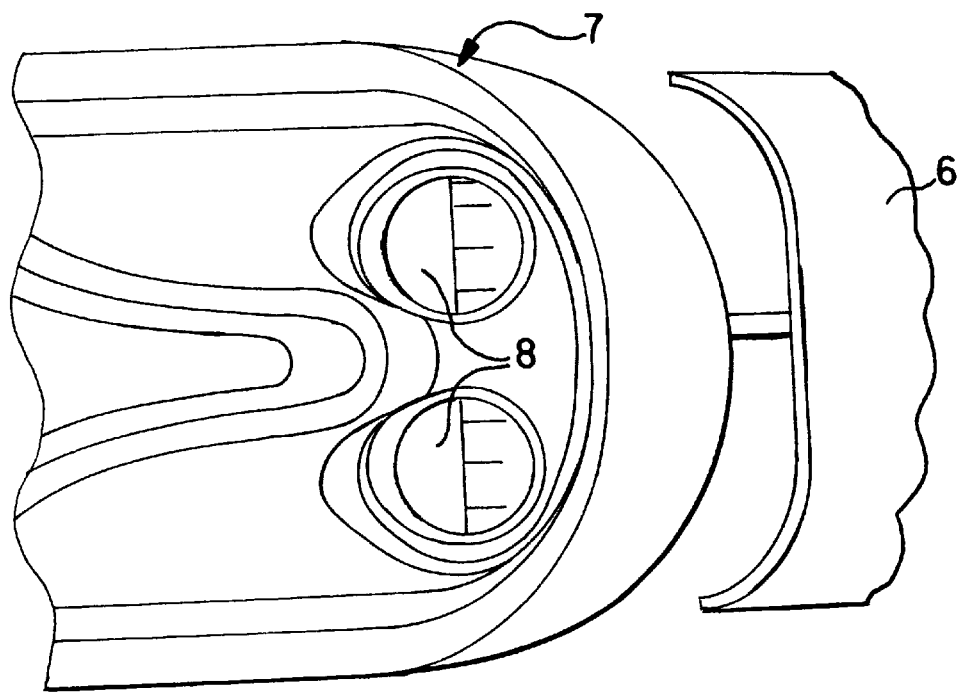
FIG. 2 is a bottom view of the buttocks part according to FIG. 1.
Figure 3:
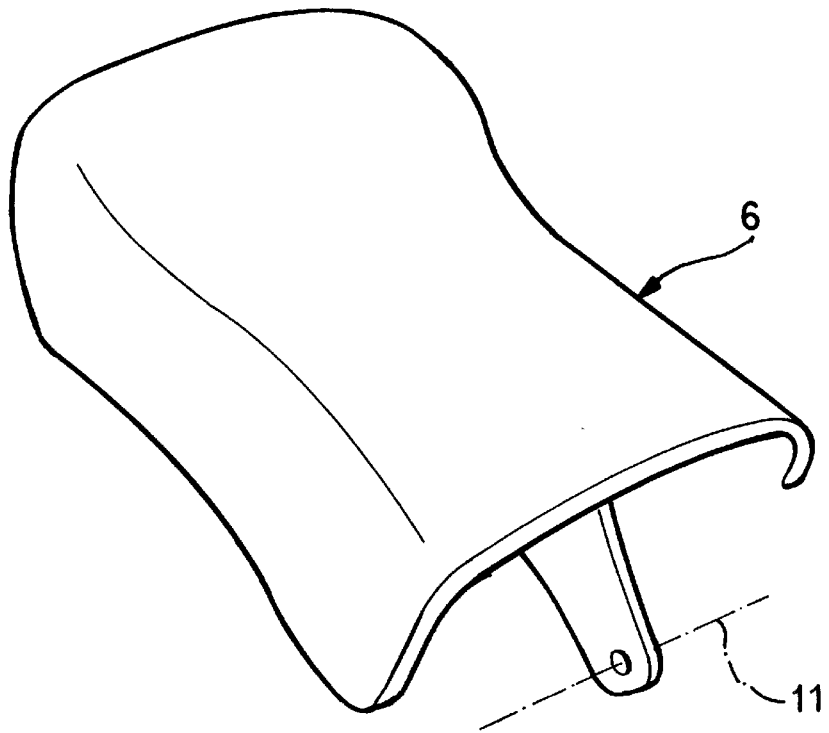
FIG. 3 is a perspective diagonal part of an unpadded back shell for a seat test body according to a preferred embodiment of the present invention.
Figure 4:
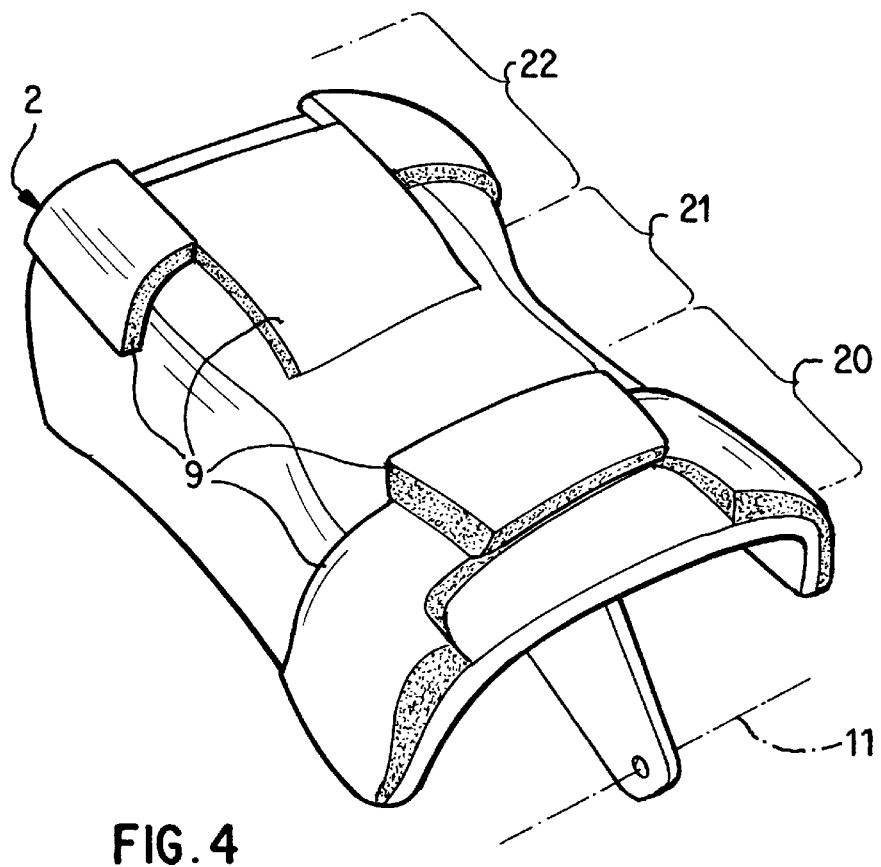
FIG. 4 is a lateral view of the back shell according to FIG. 3 in the cushioned condition.
Figure 5:
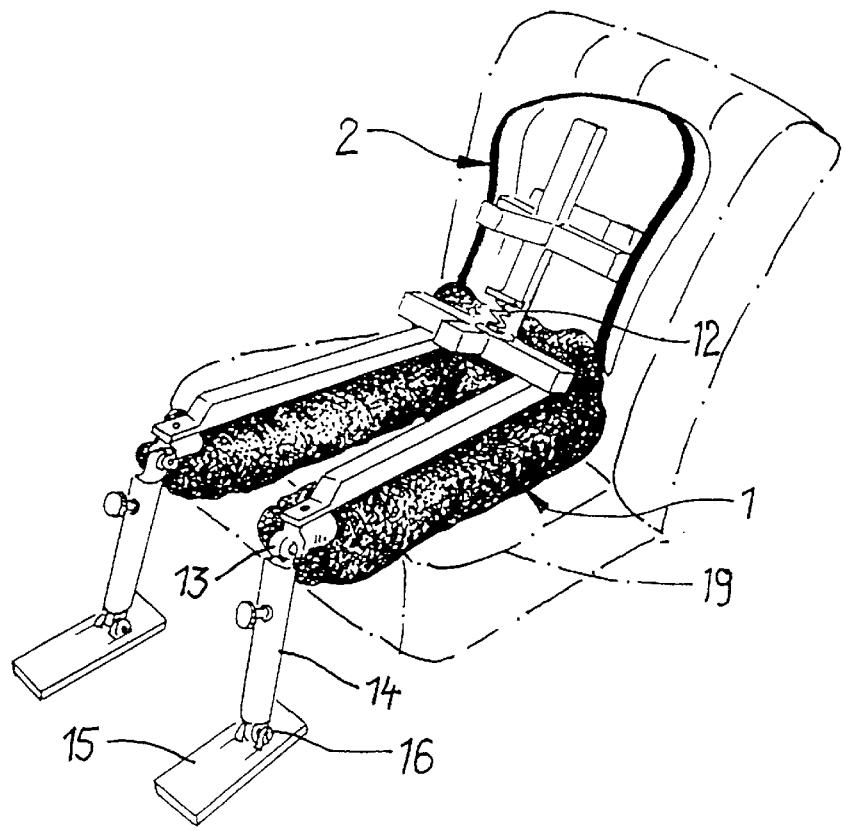
FIG. 5 is a view of a seat test body according to a preferred embodiment of the present invention placed in a vehicle seat with completed lower limbs for the floor-side support of the thigh imitations.

The reproduction of the back 2 is formed with respect to its hard part by a back shell 6 which corresponds to the rearward-side pelvic bone, the spinal column and the backside chest cage area and shoulder blade area. The padding 9 of the back shell 6, with respect to the softness and the local distribution of the strength also anthropomorphically imitates the soft parts in the back area, specifically the muscle tissue, the connective tissue and the fatty tissue in the whole back and kidney area. Specifically, as clearly illustrated in FIG. 4, in the area of the hollow back, respectively different distributions of the padding are provided, in the kidney area 21, the lordotic (lower back) area 20, and in the shoulder area 22.

The padding used to represent the buttocks parts and hard back parts may be composed of several elastic foam material inserts of different thicknesses and/or different volume weights and elasticities. The foamed-material layers which are closer to the hard parts and have larger surfaces are thicker or specifically lighter and softer than the foamed-material layers which are situated farther to the outside and have smaller surfaces. The padding may be covered with a soft leather covering and/or with a trouser fabric which, with respect to their flexibility, are similar to the human skin.

Figure 7:
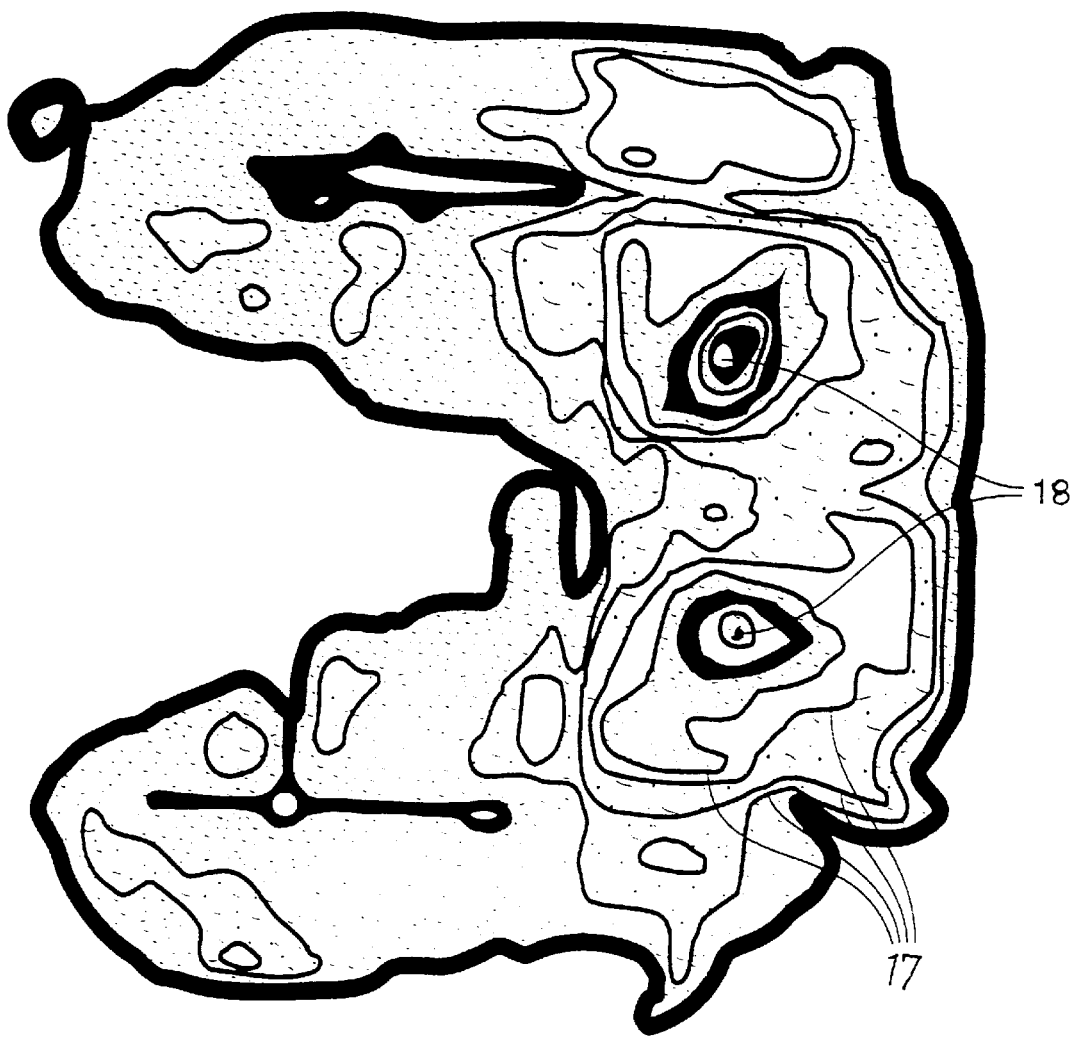
FIG. 7 is an isobaric representation of a sitting pressure distribution corresponding to a person's body of the buttocks area when a person is sitting in a seat cushion.

For reaching the required sitting weight of the seat test body, passive ballast in the form of several weights 10 is placed on the interior side in the buttocks imitation 1 and/or is held on the interior side of the back imitation 2. It is important in this case that these weights are arranged within the seat test body to be distributed such that the whole pressure by load of the seat test body in the contact surface of the buttocks part 1 and the seat cushion and the local sitting pressure distribution correspond to the pressure by load and the sitting pressure distribution of a sitting test person. Such an ergonomically correct pressure distribution is illustrated in FIG. 7. The family of isobars 17 of the pressure distribution indicates two pronounced pressure peaks 18 in the locations of the seat pressure points 8 of the buttocks part. The device and correct approach for determining such a sitting pressure distribution is described in U.S. patent application Ser. No. 08/786,444, filed Jan. 21, 1997, entitled "Seat Testing Punch" (German Patent Application 196 01 971.0-52), which is commonly assigned to the assignee of the present invention, and which is expressly incorporated by reference herein. For such a sitting pressure distribution which is close to reality, in addition to the amount of the weight load and the position of the center of gravity, when viewed in the direction of the force of gravity, mainly a reproduction of the soft parts which is true to natural in the seat area is extremely important.

Since, during vibration measurements, the seat test body not only carries out purely translational oscillation movements but also slight rotational movements, the weights of the passive ballast are also arranged within the seat test body such that not only a position of the center of gravity on the seat test body is obtained which corresponds to that of a human being approximately in its height but that also an inertia moment is obtained at least about an axis 11 on the seat test body which extends in parallel to the hip joint. In the illustrated embodiment, the passive ballast is formed by disk-shaped metal weights which, by way of their center bores, are fitted onto differently arranged receiving rods and are fixed on them via pressure screws. Alternatively, it is also contemplated that the ballast is formed by bags with sand, metal shot and/or liquid filling which are placed loosely on nets or fabric webs horizontally stretched within the seat test body. This type of weight building can simulate certain inherent dynamics of the body mass.

The back imitation 2 of the seat test body is not screwed rigidly to the buttocks imitation 1. On the contrary, the back part is swivellably disposed relative to the buttocks within a limited angular space about the hip joint point 11 and is prestressed via a spring 12 arranged tangentially at a radial distance from the hip joint 11 elastically in the sense of a stretched position of the back part and the buttocks part. For a measurement of vibrations which is close to reality with the seat test body according to the invention, not only a pressure distribution in the buttocks area which is close to reality is important but, also in the backrest or back area, the pressure distribution obtained with the seat test body must correspond approximately to the natural pressure distribution.

The thigh imitations 4 of the buttocks part 1 are constructed to an imitation of a knee joint 13. There the buttocks part 1 is supported on the floor via lower leg 14 and foot imitations 15 with the foot joint 16 which are movably connected in the knee joint area and are constructed to be movable within themselves. With this floor support of the seat test body by way of the legs or the feet, the seat test body is held and secured on the seat to be tested in a manner which is close to reality. The lower legs can be telescopically pulled out and pushed together and can be fixed in a desired pull-out length. As the result, the height of the seat surface of the seat to be tested can be adapted above the floor and a support of the thighs on the seat surface which is close to reality can be adjusted in the sense of an optimal sitting pressure distribution.

The joints 5 of natural locks part 1 which simulate the natural thigh joints are adjusted with respect to their kinetic resistance such that, although a position change of the simulated thighs 4 with respect to the simulated pelvis 3 is possible for the adjusting of the seat test body on the seat and for an optimal sitting pressure distribution, during the measurement, no free movement takes place in these joints. The movement range of the joints 5 is such that all relative positions of the thighs 4 and the pelvis 3, as they occur during an extended sitting of person, can be simulated and fixed. The padding 7 of the buttocks part is elastic in itself and, in addition, is to a certain extent flexibly connected to the thigh imitations 4, so that, during a swivelling of the thigh imitations 4 with respect to the pelvis imitation 3, the padding 7 can follow an adjusting swivel without being destroyed.

Such seat test bodies can be constructed corresponding to the size, the shape and the weight of an average man, of a man in the 95% range or of a man in the 5% range or of corresponding women and be used for testing seats.

When a seat test body of a certain size, for example, corresponding to an average man, is completed, it can be used for carrying out vibration-related seat tests. For this purpose, the seat to be tested is fastened on a vibratory platform which can be excited in the frequency range of 0–30 Hz to perform vertical sinusoidal vibrations. Then the seat test body will be placed on the seat such that an optimal sitting pressure distribution is obtained. If necessary, the optimal sitting position of the test body must be determined with a sitting pressure distribution testing mat according to an approach which is described in above-referenced U.S. patent application Ser. No. 08/786,444. The found optimal sitting position must be recorded and the measuring mat must be removed. Instead of the measuring mat, acceleration sensors can be inserted between the seat surface and the seat test body brought into the optimal sitting position. During the vibration excitation of the seat with the sitting seat test body at a defined frequency and a defined acceleration amplitude, by means of the inserted acceleration sensors, the response vibration of the vibration system formed of the seat to be tested and the seat test body can then be determined for each individual excitation vibration or excitation frequency.

Measurements by the applicant on different seats with seat test bodies according to the invention, on the one hand, and comparative measurements on the same seats in which human beings were used as test persons, on the other hand, indicated that the seat test body according to the invention furnishes measuring results in all ranges of the excitation spectrum which can be reproduced not only tendentiously but also qualitatively and are close to reality.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A seat test body for vibration measurements on seats, comprising:
    a buttocks imitation to be placed on a seat cushion of a seat to be tested and which points downward in a testing position,
    a back imitation coupled with the buttocks imitation and which is to be leaned against a backrest cushion of the seat to be tested in the testing position, and
    passive ballast in the form of several weights placed on at least one of an interior side of the buttocks imitation and an interior side of the back imitation,
    said seat test body having a weight and mass distribution corresponding approximately to the weight and mass distribution of a sitting person,
    the buttocks imitation and the back imitation each being formed hard parts and padding,
    the hard parts of the buttocks imitation simulating a pelvic bone, thighs, and hip joints of a human skeleton at least with respect to the underside of the skeleton which would be loaded while sitting, the hip joints being fixable to immobility under a test load,
    the hard parts of the back imitation simulating the lordotic area of a pelvic bone, a spinal column, and a back side of a chest cage including a shoulder blade region, of the human skeleton,
    the padding of the hard parts of the buttocks imitation anthropomorphically imitating the soft parts of a human buttocks area, including muscle tissue, connective tissue and fatty tissue, and the two sitting pressure points of the human buttocks, with respect to the parameters of shape, position, hardness, hardness distribution, layer thickness, softness, elasticity, damping behavior, imitating the hard parts and the soft parts of the human skeleton as close to life as possible.

2. A seat test body according to claim 1, wherein the weights of the passive ballast are arranged distributed within the seat test body such that the whole pressure by load in the contact surface between the buttocks imitation and the seat cushion and the local sitting pressure distribution correspond to the pressure by load and the sitting pressure distribution of an actual test person sitting in the seat.

3. A seat test body according to claim 1, wherein the weights of the passive ballast are arranged distributed within the seat test body such that at least one of an approximately identical point of gravity and an approximately identically large inertia moment about an axis on the seat test body is obtained which is situated at least in parallel to the hip joint.

4. A seat test body according to claim 1, wherein the thigh imitations are formed to a knee joint, the buttocks part being supported on a floor via lower leg and foot imitations which are movably coupled in the knee joint area and which are movable.

5. A seat test body according to claim 1, wherein the back imitation of the seat test body is disposed to be swivellable relative to the buttocks imitation within a limited angular space about the axis and is elastically prestressed in a stretched position of the back imitation and the buttocks imitation.

6. A seat test body according to claim 1, wherein the weights of the passive ballast are formed by metallic weight pieces or bags of at least one of sand, metal shot, and liquid.

7. A seat test body according to claim 1, wherein the weights of the passive ballast are placed loosely on nets or fabric webs stretched out approximately horizontally within the seat test body.

8. A seat test body according to claim 1, wherein the padding of at least one of the buttocks imitation and the back imitation is formed by several elastic foamed material layers.

9. A seat test body according to claim 8, wherein the foamed material layers which are closer to the hard parts and have a larger surface are constructed to be thicker than the foamed material layers which are situated farther to the outside and have smaller surfaces.

10. A seat test body according to claim 8, wherein the several elastic foamed material layers have varying volume weights and elasticities, the foamed material layers which are closer to the hard parts being constructed to be specifically lighter and softer than the foamed material layers situated farther to the outside.

11. A seat test body according to claim 1, wherein the padding of the hard parts of at least one of the buttocks imitation and the back imitation is covered with a soft leather covering which, has a flexibility similar to human skin.

12. A seat test body according to claim 1, wherein the padding of the hard parts of at least one of the buttocks imitation and the back imitation is covered by a trouser-type fabric.

13. A seat test body according to claim 1, wherein the hip joints allow a position change of the thigh imitations relative to the pelvic bone imitations such that all relative positions between the thigh bones and the pelvis of a sitting person can be simulated and fixed, due to an inherent elasticity and an elastic coupling therebetween, the padding being capable of following said position changes between the thigh bone imitations and the pelvis imitation.

14. A method of vibration testing a seat, using the seat test body of claim 1.

15. An anthropomorphically correct seat test body for vibration measurements on seats, comprising:

a buttocks imitation to be placed on a seat cushion of a seat to be tested, said buttocks imitation including hard parts anthropomorphically simulating a human pelvic bone with hip sockets and anthropomorphically simulating human thigh bones coupled to said hip sockets, and soft parts coupled to said hard parts, said soft parts simulating muscle tissue, connective tissue and fatty tissue of a human buttocks; and a back imitation coupled with the buttocks imitation, said back imitation to be leaned against a backrest cushion of the seat to be tested.

16. A seat test body according to claim 15, wherein said seat test body has a weight and mass distribution corresponding approximately to the weight and mass distribution of an actual sitting person.

* * * * *